United States Patent [19]

Lamartina et al.

[11] 3,819,869

[45] June 25, 1974

[54] LINE CONCENTRATOR FOR TELEPHONE EXCHANGE

[75] Inventors: Alfonso Lamartina; Enrico Cicognani, both of Milan; Riccardo Caldarella, Rho; Athos Antonini, Milan, all of Italy

[73] Assignee: Societe Italiana Telecomunicazioni Siemens S.p.A., Milan, Italy

[22] Filed: Apr. 26, 1973

[21] Appl. No.: 354,746

[30] Foreign Application Priority Data

Apr. 27, 1972 Italy ................................ 23585/72

[52] U.S. Cl. .......................................... 179/18 FC

[51] Int. Cl. .......................................... H04q 11/04

[58] Field of Search.......... 179/18 FC, 18 F, 18 FH, 179/15 BY, 15 AT; 178/2 R, 3, 4.1 R

[56] References Cited

UNITED STATES PATENTS 3,206,553 9/1965 Lucas et al. .................... 179/18 FC 3,592,970 7/1971 Cappetti et al. ................ 179/18 FC

*Primary Examiner*—Thomas A. Robinson

*Attorney, Agent, or Firm*—Karl F. Ross; Herbert Dubno

[57] ABSTRACT

A set of *s* incoming two-wire lines, upon carrying multifrequency digital signals from a pushbutton-type station selector, are connectable to a reduced number of *n* outgoing two-wire lines, leading to respective digit decoders, by means of an analog coupler comprising *s* input transformers and *n* output transformers interconnected via a common pair of bus bars which are grounded trough respective resistors. The secondaries of the input transformers and the primaries of the output transformers are connected to these bus bars through diodes normally blocking signal transmission, any of these transformers being made operative through a d-c biasing voltage applied to centertaps of the *s* input secondaries from a decoding matrix and to centertaps of the *n* output primaries from a scanner which cyclically connects that matrix to a set of *n* registers to sample same for the addresses of active incoming lines stored therein under the control of another scanner. The registers so sampled are loaded with the called-number digits from active lines after decoding in the signal receivers to which the digital signals are transmitted through the analog coupler.

10 Claims, 6 Drawing Figures

LINE CONCENTRATOR FOR TELEPHONE EXCHANGE

Field of the Invention

Our present invention relates to a line concentrator for a telecommunication system, specifically (though not exclusively) a telephone exchange in which a larger multiplicity ($s$) of incoming lines are to be selectively connected to a smaller multiplicity ($n$) of outgoing lines upon the detection of an activity-indicating signaling condition on any of these incoming lines.

Background of the Invention

In modern telephone exchanges operating on the space-division (as distinct from time-division) principle, the initiation of a call by an associated subscriber alerts the central-office equipment of the exchange to make available a call register which stores the digits of the called number as received over the usual line finder on one of its local lines or cords. If the digit is identified by a signal combination (such as a group of audio frequencies) generated by a call selector of the pushbutton type, its value can be instantaneously stored upon a decoding of that signal combination in a suitable receiver therefor. The transmission of such a digit is usually accompanied by a line signal, such as a d-c voltage, lasting either for the duration of the digit signal or for a predetermined maximum period allotted to its generation. Such a line signal may be used to switch the cord seized by a calling line from an associated chain of selector switches, serving to establish a talking connection with the called subscriber, to an available register for the storage and possible recordal of the selected digit.

Objects of the Invention

One of the objects of the invention is to provide simple circuitry in such a system for facilitating the entry of a digit from any active incoming line, among a relatively large multiplicity ($s$) of such lines, in an available register forming part of a relatively small multiplicity ($n$) of such registers.

Another object is to provide an analog coupler adapted to establish one signaling connection at a time between any one of $s$ incoming lines and any one of $n$ outgoing lines via a minimum number ($s + n$) of junctions therebetween.

A further object, allied to the preceding one, is to provide an analog coupler enabling in simple fashion an increase in the number of incoming and/or outgoing lines served thereby.

Summary of the Invention

A telephone exchange or similar telecommunication station embodying our invention, equipped with $s$ incoming lines, $n$ outgoing lines ($n << s$) and detectors for ascertaining the activity of the incoming lines as discussed above, includes a counter which periodically generates the addresses of all the incoming lines in a predetermined order of succession and supplies them to an allocation unit also receiving activity signals from the several detectors. The coincidence of a line address in the output of a counter with an activity signal relating to the same line gives rise to an enabling signal on one of $n$ outputs of the allocation unit to unblock a normally blocked connection between the counter output and an address-storage section of a corresponding call register which is thereby loaded with the instantaneous count representing the address of such active line. The registers are periodically sampled by a scanner which sequentially switches a first group of $n$ control leads, identifying each register as it is sampled, from a normal to an off-normal state of energization; a decoding matrix, successively connected to these registers by the scanner, converts the addresses stored therein into individual voltages on a second group of control leads whose energization thus identifies the incoming line to which a particular register has been allocated. The concurrent change in the state of energization of a single lead of each group actuates an analog coupler inserted between the incoming and outgoing lines, the coupler thereupon establishing an operative connection between the two lines identified by the characteristically energized control leads. The outgoing line then receives the digital signal or signals from the incoming line temporarily joined to it and feeds same, generally via a decoder, to a digit-storage section of the register associated with that outgoing line.

In order to prevent the successive allocation of different call registers to an active incoming line, the transmission of an activity signal from a detector to the allocation unit is blocked whenever an address of the line monitored thereby has already been entered in such a register. This blocking of signal transmission is brought about by an inhibiting signal which may be generated by the decoding matrix but which could also be registered in one of $s$ time slots of a circulating memory assigned to the line in question. In either case the inhibiting signal disappears as soon as the register has been cleared, e.g. upon a transfer of its contents to a recorder or upon the termination of an abortive call as is well know per se.

In accordance with another feature of our invention, applicable to systems of other than the aforedescribed type, the $s$ incoming lines are of the two-wire type and work into respective input transformers of the analog coupler while the $n$ outgoing lines, also of the two-wire type, are fed from respective output transformers of that coupler. The secondaries of the input transformers and the primaries of the output tranformers are connected to a common pair of bus bars normally maintained at a reference potential (usually ground) through a pair of resistors. The connection between these transformer windings and the bus bars include respective diode pairs in bucking relationship which effectively block the passage of signal currents as long as their midpoints are maintained at a normal biasing potential. Upon the simultaneous application of an unblocking voltage of a given polarity (e.g. positive) to the midpoint of one input secondary and to the midpoint of one output primary, a-c signals will pass from the corresponding incoming line to the corresponding outgoing line through the associated diodes and the common bus bars. Thus, in the digit-storing system briefly described above, the control leads for the scanner terminate at respective centertaps of the primaries of the $n$ output transformers whereas the control leads from the decoding matrix terminate at respective centertaps of the secondaries of the $s$ input transformers.

Brief Description of the Drawing

The above and other features of our invention will now be described in detail with reference to the accompanying drawing in which.

Specific Description

Figure 1:
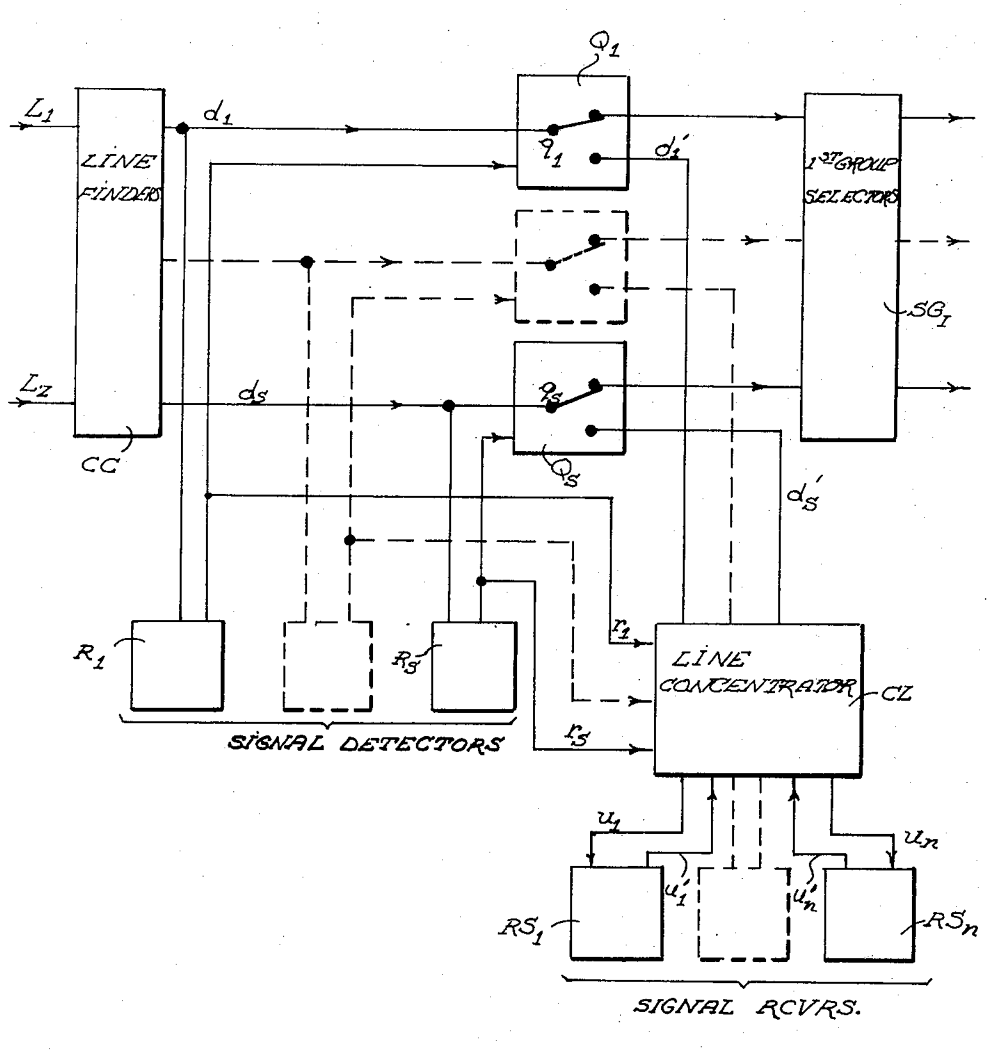
FIG. 1 is an overall block diagram illustrating part of a telephone exchange equipped with a line concentrator according to our invention.
Figure 2:
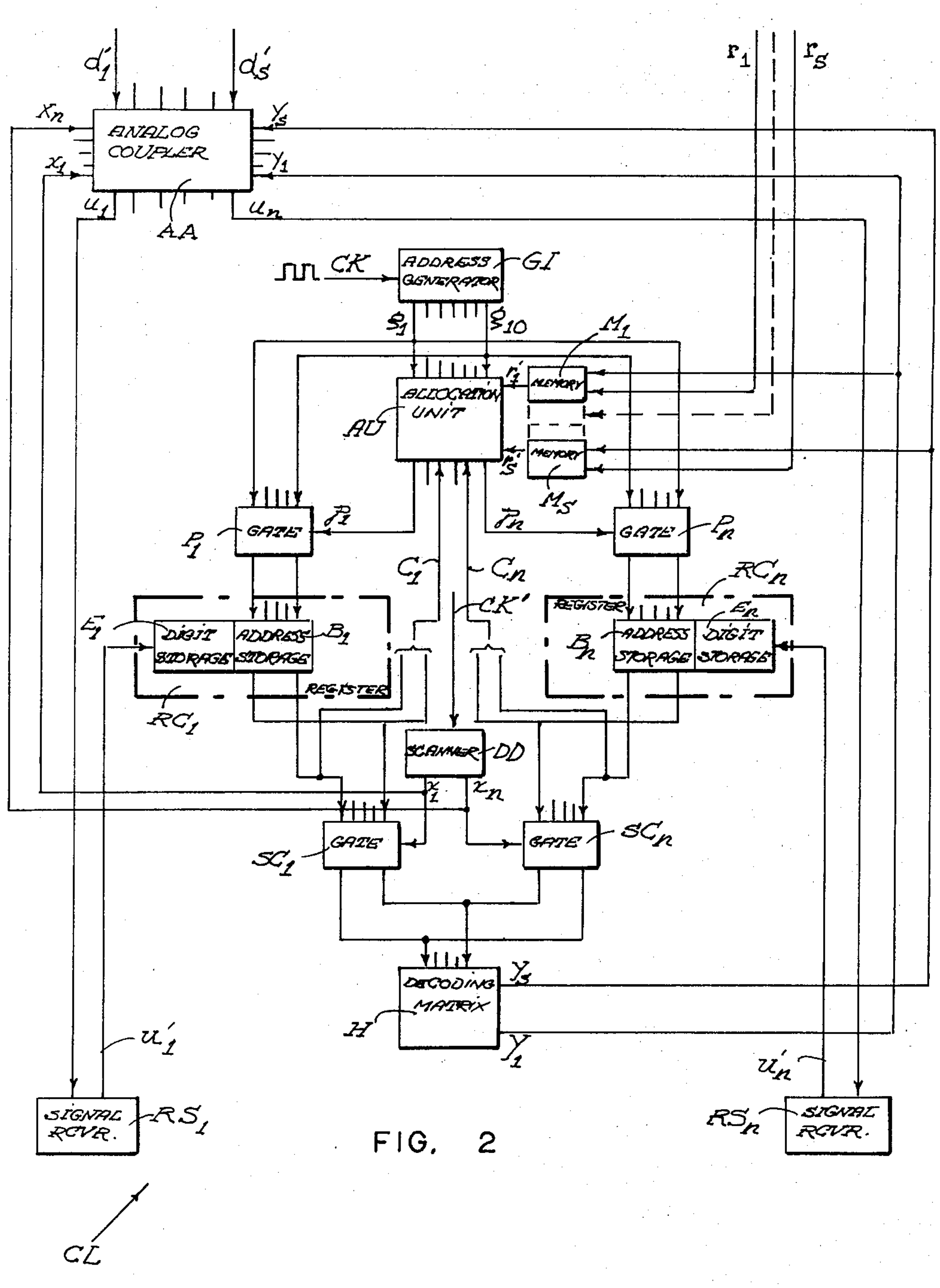
FIG. 2 is a more detailed circuit diagram of the line concentrator of FIG. 1.

In FIG. 1 we have shown part of a telephone exchange representing the terminus of a large number of subscriber lines $L_1 - L_z$. A conventional set of line finders CC, responding to the initiation of a call by any subscriber, extend the calling lines to a set of cords $d_1 - d_s$ normally connected via relay contacts $q_1 - q_s$ to conventional trains of selector switches of which only the first group selectors have been schematically illustrated at $SG_l$. The relays $Q_1 - Q_s$ controlling the contacts $q_1 - q_s$ are operable by signal detectors $R_1 - R_s$, respectively connected across lines $d_1 - d_s$, which respond to digital signals on any of these lines with a certain delay designed to let the selector switches $SG_l$ etc. extend the call; thereafter, the responding detector reverses the associated armature $q_1 - q_s$ to connect the respective line $d_1 - d_s$ through a corresponding conductor $d'_1 - d'_s$ to the input of a line concentrator CL. The outputs $r_1 - r_s$ of detectors $R_1 - R_s$, besides switching the relays $Q_1 - Q_s$, also transmit their activity signals directly to the line concentrator CL. The latter feeds a set of outgoing lines $u_1 - u_n$ which lead to respective signal receivers $RS_1 - RS_n$ where the digital codes present on conductors $d'_1 - d'_s$ are decoded for transmission via conductors $u'_1 - u'_n$ to respective call registers $RC_1 - RC_n$ within concentrator CL as illustrated in FIG. 2.

Each register $RC_1 - RC_n$ comprises an address-storage section $B_1 - B_n$ and a digit-storage section $E_1 - E_n$, the latter being connected to the associated signal receiver $RS_1 - RS_n$ through the corresponding line extension $u'_1 - u'_n$. Outgoing lines $u_1 - u_n$, leading to these signal receivers, originate at an analog coupler AA which is more fully illustrated in FIG. 3 discussed hereinafter. Incoming lines $d'_l - d'_s$ terminate at the analog coupler AA which also has two groups of control inputs respectively connected to a set of control leads $x_l - x_n$.

In the present discussion it will be assumed that $s$, the number of incoming lines or cords, is about 1,000 so that each of these cords $d'_l - d'_s$ can be identified by a 10-bit binary address cyclically generated by a counter GI with ten output leads $g_l - g_{10}$, the counter being stepped by clock pulses CK from a non-illustrated timer. Leads $g_1 - g_{10}$ are connected in parallel to an allocation unit AU and to a set of $n$ normally blocked gating circuits $p_l - p_n$ leading to the address sections of registers $RC_1 - RC_n$. Allocation unit AU also receives, via a set of leads $r'_l - r'_s$, activity signals which appear in the detector outputs $r_l - r_s$ and which are stored in respective stages $M_l - M_s$ of a buffer memory inserted between the detectors $R_l - R_s$ of FIG. 1 and the allocation unit AU. Unit AU, whose construction is more fully described below with reference to FIGS. 5 and 6, determines the coincidence of any line address on leads $g_1 - g_{10}$ with an activity signal on a lead $r'_l - r'_s$ whose subscript corresponds to that address; upon such coincidence, unit AU energizes one of $n$ outputs $p_l - p_n$ to unblock a corresponding gating circuit $P_l - P_n$ for transmission of that address to a respective call register $RC_l - RC_n$.

A scanner DD, stepped by clock pulses CK', periodically samples the registers $RC_l - RC_n$ by unblocking respective gating circuits $SC_l - SC_n$ inserted between their address sections $B_l - B_n$ and a decoding matrix H. The bits representing the stored addresses in sections $B_l - B_n$ are also supplied, via respective cables $C_l - C_n$, to allocation unit AU to indicate the free or busy condition of any register.

Decoding matrix H converts the stored address bits, received via any one of gating circuits $SC_l - SC_n$, into a voltage energizing one of a group of $s$ control leads $Y_l - Y_s$ terminating at coupler AA. Branches of these control leads also extend to memory stages $M_l - M_s$ to clear same and to prevent any further loading thereof, during energization of the corresponding lead, so that an activity signal appearing on any of the conductors $r_l - r_s$ cannot be read out into unit AU more than once. The cadences of clock pulses CK and CK' are advantageously so correlated that a cycle of address generator GI consisting of $s$ clock pulses CK coincides with a sampling cycle of scanner DD consisting of $n$ clock pulses CK'.

Figure 3:
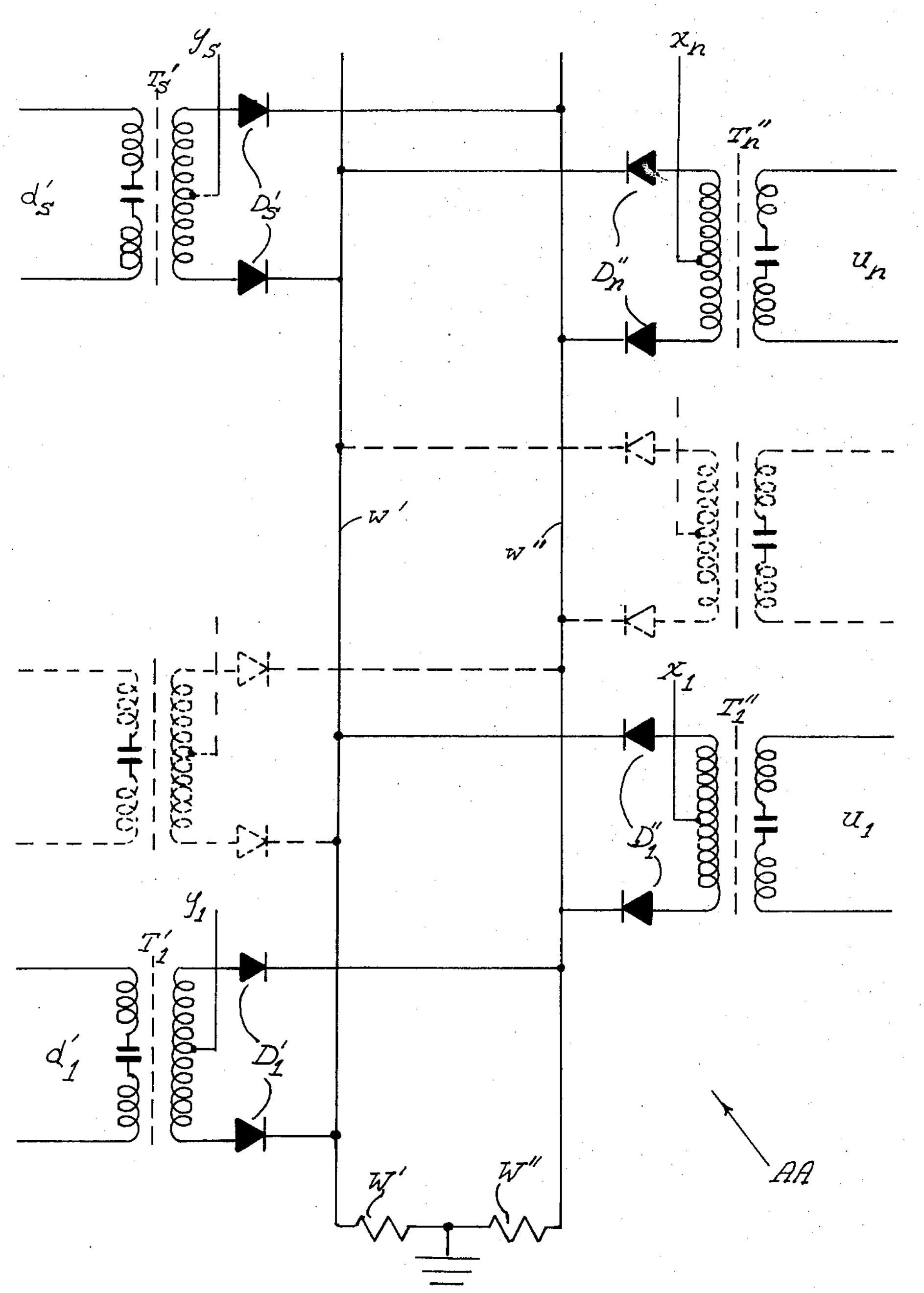
FIG. 3 is a circuit diagram of an analog coupler included in the line concentrator of FIG. 2.

Reference will now be made to FIG. 3 for a more detailed description of analog coupler AA. The coupler comprises two bus bars $w'$, $w''$ which are grounded through respective resistors W' and W'' of equal magnitude. The incoming lines $d'_l - d'_s$ are connected in parallel across these bus bars by way of respective input transformers $T'_l - T'_s$ whose secondary windings are in series with diode pairs $D'_l - D'_s$ inserted in bucking relationship between their extremities and the two bus bars. In an analogous manner, diode pairs $D''_l - D''_n$ are inserted between bus bars $w'$, $w''$ and the extremities of the primary windings of respective output transformers $T''_l - T''_n$ working into outgoing lines $u_l - u_n$.

Control leads $x_l - x_n$ from scanner DD (FIG. 2) terminate at centertaps of the primaries of output transformers $T''_l - T''_n$, respectively; similarly, control leads $y_l - y_s$ from decoding matrix H (FIG. 2) terminate at centertaps of the secondaries of respective input transformers $T'_l - T'_s$. Normally, all control leads $y_l - y_s$ are at negative potential relative to ground so that signal frequencies on incoming lines $d_l - d_s$ cannot reach the common bus bars $w'$, $w''$. However, if a register $RC_l - RC_n$ (FIG. 2) containing the address of an active line is sampled by the scanner DD, the presence of that address (i.e. of at least one finite bit in the input of matrix H) drives the corresponding control leads positive so that the associated diode pair in the secondary circuit of the respective input transformer conducts to let the signal frequency or frequencies pass to the bus bars $w'$, $w''$. Control leads $x_l - x_n$ are also normally negative but are successively driven positive, in the rhythm of the scan, whereby the signals developed on bus bars $w'$, $w''$ reach one of the outgoing lines through the conducting diodes of the primary circuit of the corresponding output transformer. The signal frequencies thus transmitted to the lines $u_l - u_n$ are decoded in the respective receiver $RS_l - RS_n$ and converted into binary form for storage in the digit section $E_l - E_n$ of the respective register. After all the call digits received over an incoming line have been thus registered, they and the accompanying address information can be transferred to a permanent storage device in a manner not further illustrated whereupon the register is again available; the inhibition of the memory stage $M_1 - M_s$ heretofore associated with that register is thereby terminated.

The analog coupler shown in FIG. 3 can be readily extended to serve a larger number of input and/or output lines by connecting additional transformers across bus bars $w''$, $w''$. Obviously, the relative magnitude of the numbers $s$ and $n$ of these lines is immaterial to the operation of this device.

Figure 4:
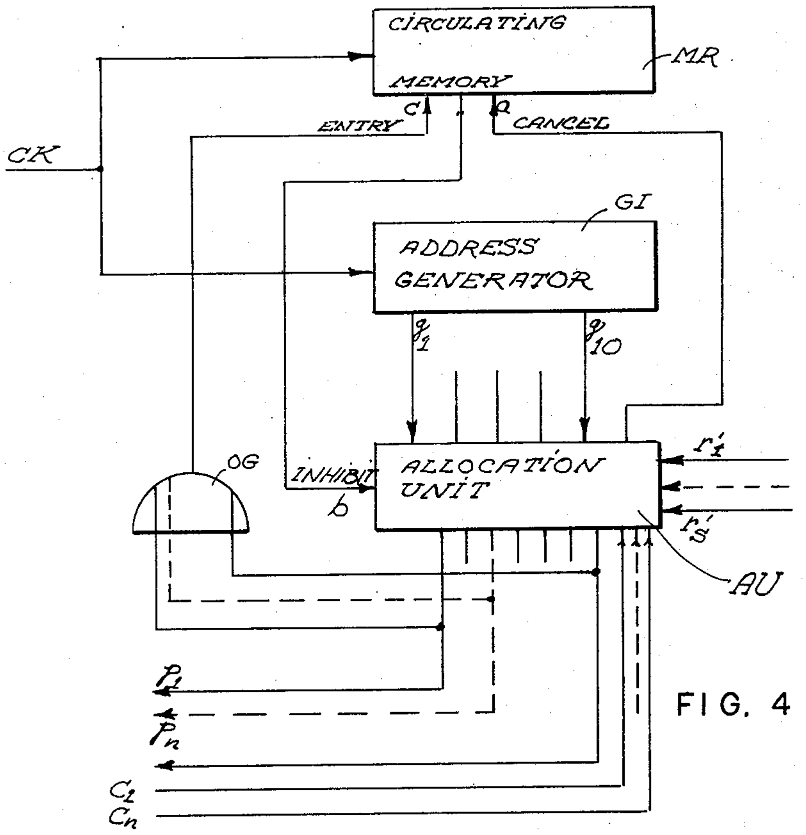
FIG. 4 is a block diagram showing a partial modification of the line concentrator of FIG. 2.

As illustrated in FIG.4, the address generator GI and the allocation unit AU may be supplemented by a circulating memory MR which is stepped by the clock pulses CK in the rhythm of the address generator and which contains $s$ time slots respectively assigned to the incoming lines $d'_1 - d'_s$. The $n$ outputs $p_1 - p_n$ of allocation unit AU have branches terminating at an OR gate OG from which, upon the energization of any of these outputs, a bit is entered in the corresponding time slot of circulating memory MR via a lead $c$. The bit so stored is read out to unit AU, via a lead $b$, whenever the time slot recurs in subsequent memory cycles; upon the de-energization of the corresponding conductor $r'_1 - r'_s$, unit AU transmits to memory MR a cancellation signal carried on a lead $a$. The bit read out on lid $b$ has the effect of preventing the allocation of another register to an incoming line whose address is already entered in one register.

Figure 5:
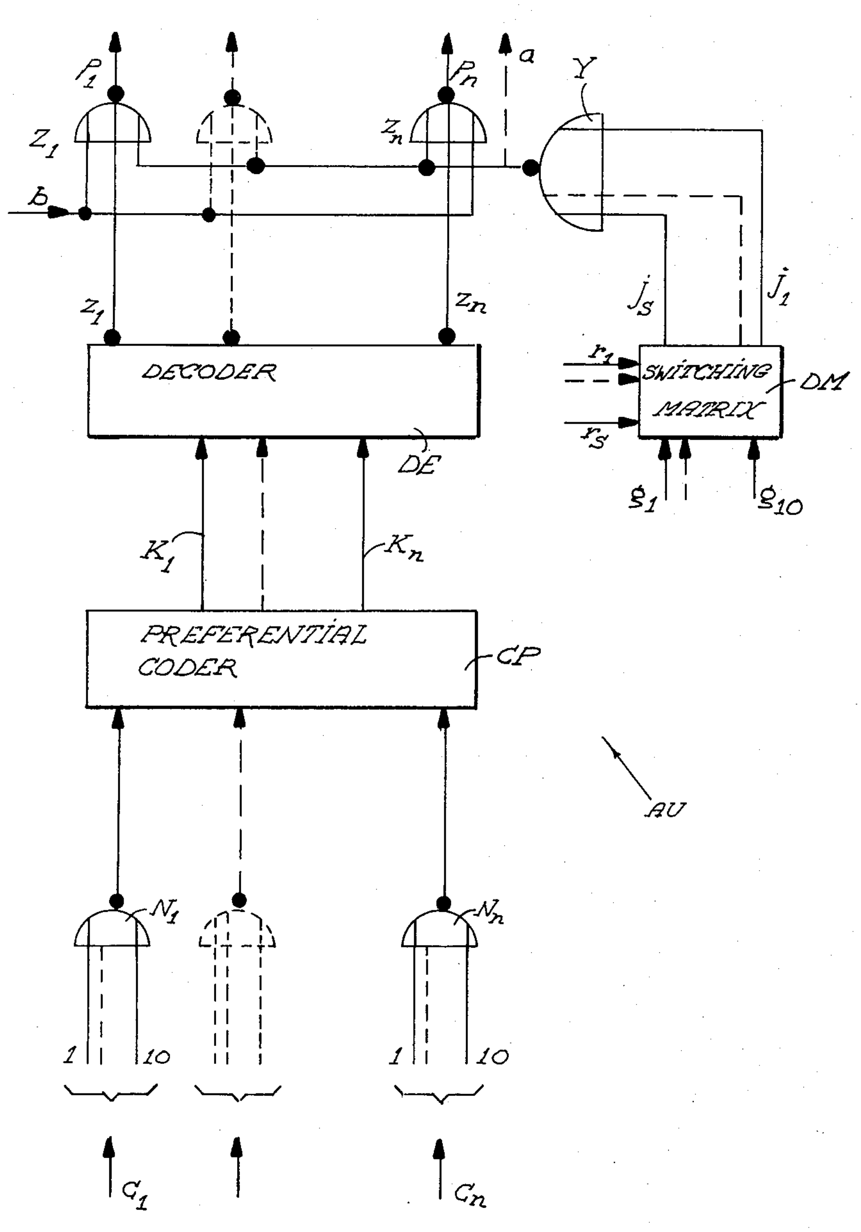
FIG. 5 is a more detailed diagram of an allocation unit included in the line concentrator of FIG. 4.

Reference will now be made to FIG. 5 which shows details of the allocation unit AU as used in the modified system of FIG. 4. The same unit can be employed in the system of FIG. 2, except that leads $a$ and $b$ will have no function and should be disconnected.

As shown in FIG. 5, allocation unit AU comprises a set of NOR gates $N_1 - N_n$ with 10 inputs each, these inputs being connected to the several conductors of respective cables $C_1 - C_n$ (cf. FIG. 2). If the address-storage section $B_1 - B_n$ of a register $RC_1 - RC_n$ is empty, none of these inputs is energized so that the corresponding NOR gate $N_1 - N_n$ has an output that is fed to a preferential coder CP of conventional type which thereupon energizes a set of code conductors $K_1 - K_n$ to identify, in a binary code, the lowest-ranking available register as determined by the outputs of those NOR gates. A decoder DE translates this binary code into a de-energization of one of its normally energized output leads $z_1 - z_n$ terminating at a respective NOR gate $Z_1 - Z_n$. The latter NOR gates also have second inputs tied to lead $b$ and third inputs tied to lead $a$ which orginates at a NOR gate Y. A switching matrix DM is connected to the 10 output leads $g_1 - g_{10}$ of the address-generating counter GI and is further connected to the conductors $r_1 - r_s$ coming from detectors $R_1 - R_s$ of FIG. 1. Matrix DM has $s$ outputs $j_1 - j_s$ terminating at NOR gate Y.

Figure 6:
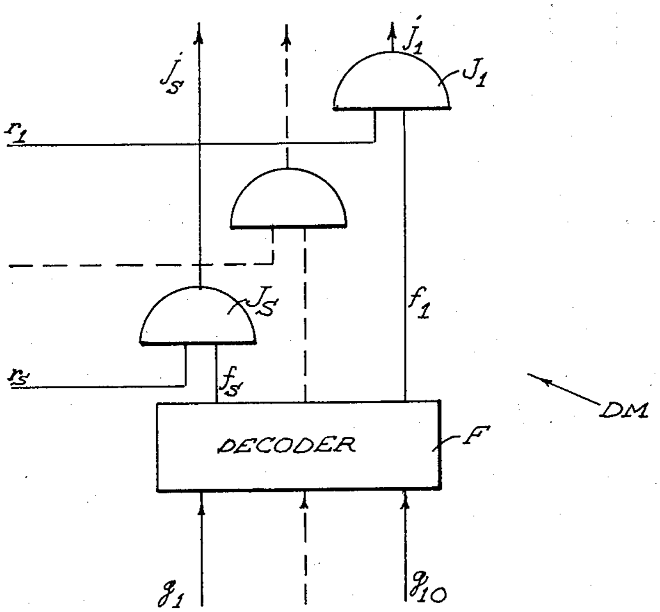
FIG. 6 shows further details of a switching matrix forming part of the allocation unit of FIG. 5.

As illustrated in FIG. 6, matrix DM includes a decoder F which is similar to matrix H of FIG. 2. The output leads $f_1 - f_s$ of this decoder terminate at respective AND gates $J_1 - J_s$ whose other inputs are connected to conductors $r_1 - r_s$. Gates $J_1 - J_s$ respectively energize the leads $j_1$ – jhd $s$ extending to NOR gate Y.

In the system of FIG. 2, conductors $r_1 - r_s$ would be replaced by the read-out leads $r'_1 - r'_s$ of memory stages $M_1 - M_s$.

As will be apparent from FIG. 5, a NOR gate $Z_1 - Z_n$ can conduct only if the associated (inverting) output of decoder DE is de-energized, if lead $b$ carries no voltage and if at least one of the inputs $j_1 - j_s$ of NOR gate Y is energized so that lead $a$ is also open-circuited. Thus, voltage on, say, lead $j_1$ periodically recurs as long as an activity signal persists on lead $r_1$; however, the concurrent energization of lead $b$ by the bit stored in circulating memory MR (FIG. 4) inhibits the energization of any output $p_1 - p_n$ even if a call register is available. After the disappearance of the activity signal on lead $r_1$ has caused cancellation of the inhibiting bit in the No. 1 time slot of the circulating memory, a re-energization of lead $r_1$ (e.g. upon the selection of the next digit by the calling subscriber) allows the allocation of the same or a different call register to line $d'_1$; thus, any allocated call register should be cleared as soon as the digit stored therein is no longer being transmitted.

In the system of FIG. 2, in which the energization of lead $r'_1$ is terminated after the first occurrence of the address of line $d'_1$ in the output of counter GI, the allocation of another call register to line $d'_1$ is prevented as long as the address of that line is still stored in the register originally allocated.

We claim:

1. In a telecommunication system including a larger multiplicity of incoming lines, a smaller multiplicity of outgoing lines and detector means connected to said incoming lines for ascertaining a signaling condition thereon, the combination therewith of:

counting means for periodically generating an address of any one of said incoming lines in a predetermined order of succession;

circuit means connected to said detector means for carrying activity signals identifying any of said incoming lines in the presence of said signaling condition thereon;

a set of n registers with signal-storage means respectively accessible to said outgoing lines and with address-storage means having normally blocked input connections extending from said counting means;

allocation means connected to said circuit means and to said counting means for receiving said addresses and said activity signals therefrom, said allocation means having $n$ outputs for unblocking the input connection of the address-storage means of any one of said n registers upon coincidence of an activity signal with the address of a line identified thereby;

a set of first control leads with a normal and an off-normal state of energization;

a set of second control leads with a normal and an off-normal state of energization;

scanning means connected to said registers for periodically sampling the contents of their address-storage means and changing the state of energization of respective first control leads identifying said registers;

decoding means periodically connectable to the address-storage means of all said registers under the control of said scanning means for changing the state of energization of respective second control leads identifying the active incoming lines whose addresses are stored therein; and an analog coupler inserted between said incoming and outgoing lines with a set of $n$ inputs respectively connected to said first control leads and with a set of s inputs respectively connected to said second control leads for selectively connecting any incoming line identified by a second control lead in its off-normal state of energization with an outgoing line identified by a first control lead in an off-normal state of energization.

2. The combination defined in claim 1, further comprising inhibiting means responsive to the entry of a stored address in any of said registers for preventing the transmission to said allocation means of an activity signal pertaining to an incoming line identified by such stored address.

3. The combination defined in claim 2 wherein said circuit means includes a set of $s$ memory stages with read-out circuits controlled by said inhibiting means.

4. The combination defined in claim 3 wherein said inhibiting means comprises respective clearing connections between said second control leads and said memory stages.

5. The combination defined in claim 2 wherein said inhibiting means comprises a circulating memory synchronized with said counting means and connected to said $n$ outputs for entry of bits in respective time slots assigned to active incoming lines, said allocation means having a cancellation output terminating at said circulating memory for deleting a bit stored in any of said time slots upon the disappearance of an activity signal from the corresponding incoming line.

6. The combination defined in claim 1 wherein said analog coupler comprises a group of $s$ input transformers respectively connected to said incoming lines for energization thereby, a group of $n$ output transformers respecitvely connected to said outgoing lines for energizing same, a pair of bus bars common to all said transformers, said output transformers having primary windings connected in parallel across said bus bars by way of respective first diode pairs, said input transformers having secondary windings connected in parallel across said bus bars by way of respective second diode pairs, the diodes of each pair being connected in bucking relationship with each other, said first control leads terminating at respective centertaps of said primary windings, said second control leads terminating at resptective centertaps of said secondary windings, and biasing means connected to said bus bars for maintaining each pair of said diodes nonconductive in the normal state of energization of the lead connected to the associated centertap.

7. The combination defined in claim 6 wherein said biasing means includes a resistive ground connection for each of said bus bars.

8. In a signaling system including a multiplicity of $s$ incoming lines and a multiplicity of $n$ outgoing lines, the combination therewith of an analog coupler comprising:

- a group of s input transformers respectively connected to said incoming lines for energization thereby;
- a group of $n$ output transformers respectively connected to said outgoing lines for energizing same;
- a pair of bus bars common to all said transformers, said input transformers having secondary windings connected in parallel across said bus bars, said output transformers having primary windings connected in parallel across said bus bars;
- a first diode pair connected in bucking relationship between each of said primary windings and said bus bars;
- a second diode pair connected in bucking relationship between each of said secondary windings and said bus bars;
- biasing means connecting said bus bars to a source of reference voltage;
- first circuit means normally applying a blocking voltage to each first diode pair, said first circuit means being selectively switchable to apply an unblocking voltage to any one of said first diode pairs; and
- second circuit means normally applying a blocking voltage to each second diode pair, said second circuit means being selectively switchable to apply an unblocking voltage to any one of said second diode pairs whereby signals from an input transformer associated with an unblocked second diode pair are transmitted to an output transformer associated with an unblocked first diode pair.

9. The combination defined in claim 8 wherein the diodes of each pair are connected to opposite terminals of the associated winding, said first and second circuit means comprising leads terminating at the midpoints of said windings.

10. The combination defined in claim 8 wherein said biasing means comprises a pair of resistors inserted between said source of reference voltage and said bus bars.

* * * * *